(12) United States Patent
Aida

(10) Patent No.: US 6,978,421 B1
(45) Date of Patent: Dec. 20, 2005

(54) HANDWRITING TEXT INPUT SYSTEM

(76) Inventor: Mitsuhiro Aida, 3-8-25 Saikujo-cho, Nara City, Nara 630 (JP)

(*) Notice: Subject to any disclaimer, the term of this patent is extended or adjusted under 35 U.S.C. 154(b) by 63 days.

(21) Appl. No.: 08/813,247

(22) Filed: Mar. 7, 1997

Related U.S. Application Data

(63) Continuation of application No. 08/330,573, filed on Oct. 28, 1994, now abandoned.

(30) Foreign Application Priority Data

Jun. 19, 1994 (JP) .............................................. 6-171532

(51) Int. Cl.[7] .......................................... G06F 17/00
(52) U.S. Cl. ...................... 715/532; 715/534; 715/541
(58) Field of Search ................................ 715/532, 534, 715/541; 707/532, 534, 541; 345/171; 364/419.1, 419.11–419.15, 419.01, 419.02, 419.03; 382/13

(56) References Cited

U.S. PATENT DOCUMENTS

| | | | |
|---|---|---|---|
| 4,503,426 A | | 3/1985 | Mikulski |
| 5,109,352 A | * | 4/1992 | O'Dell ........................ 707/542 |
| 5,113,452 A | * | 5/1992 | Chatani et al. ............. 382/187 |
| 5,151,950 A | * | 9/1992 | Hullender .................... 382/13 |
| 5,212,769 A | * | 5/1993 | Pong .......................... 345/467 |
| 5,218,538 A | | 6/1993 | Zhang |
| 5,303,150 A | * | 4/1994 | Kameda ........................ 704/9 |
| 5,305,207 A | * | 4/1994 | Chiu .......................... 707/535 |
| 5,367,453 A | * | 11/1994 | Capps et al. ........... 364/419.13 |
| 5,468,077 A | * | 11/1995 | Motokado et al. ............ 400/26 |
| 5,526,259 A | * | 6/1996 | Kaji ............................... 704/3 |
| 5,592,565 A | * | 1/1997 | Shojima et al. ............. 382/185 |
| 5,615,378 A | * | 3/1997 | Nishino et al. ................ 704/4 |
| 5,828,783 A | * | 10/1998 | Ishigaki ...................... 382/186 |
| 5,870,492 A | * | 2/1999 | Shimizu et al. ............. 382/187 |

FOREIGN PATENT DOCUMENTS

| | | |
|---|---|---|
| EP | 0643357 | 1/2002 |
| GB | 2289561 B | 6/1998 |

OTHER PUBLICATIONS

Computer World, Mar. 7, 1994, "Corporate Acceptance Hinges on Open Strategy", Mark Halper.*

* cited by examiner

Primary Examiner—Sanjiv Shah

(57) ABSTRACT

A data is input, character by character or stroke by stroke, to form a line of text. The system looks up in a dictionary and determines a unique one in the dictionary including entered line of text data and being with (1) leading part be unique, or (2) first part and some following data be unique, or (3) stem of word and last character be unique, or stem of word and some following characters be unique, 4) first part and last part be unique, or first part and some following data be unique. No more input is necessary after finding the unique data.

18 Claims, 14 Drawing Sheets

Figure 1  Block diagram

A block diagram of the invention system

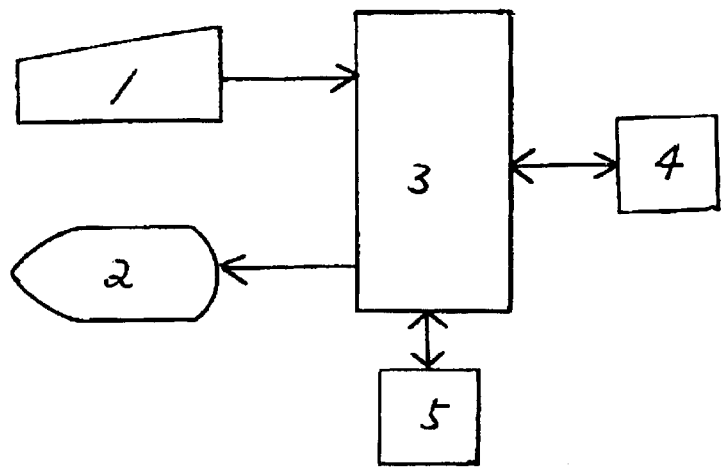

1: Input system
2: Output system
3: Control system, including the control of all the system, being adapted to inputting and outputting the text characters on the display, edit characters in the text, and making such conversion as the input characters to an appropriate word or a combination of words, etc.
4: Memory system
5: Dictionary system Figure 2 Flowchart
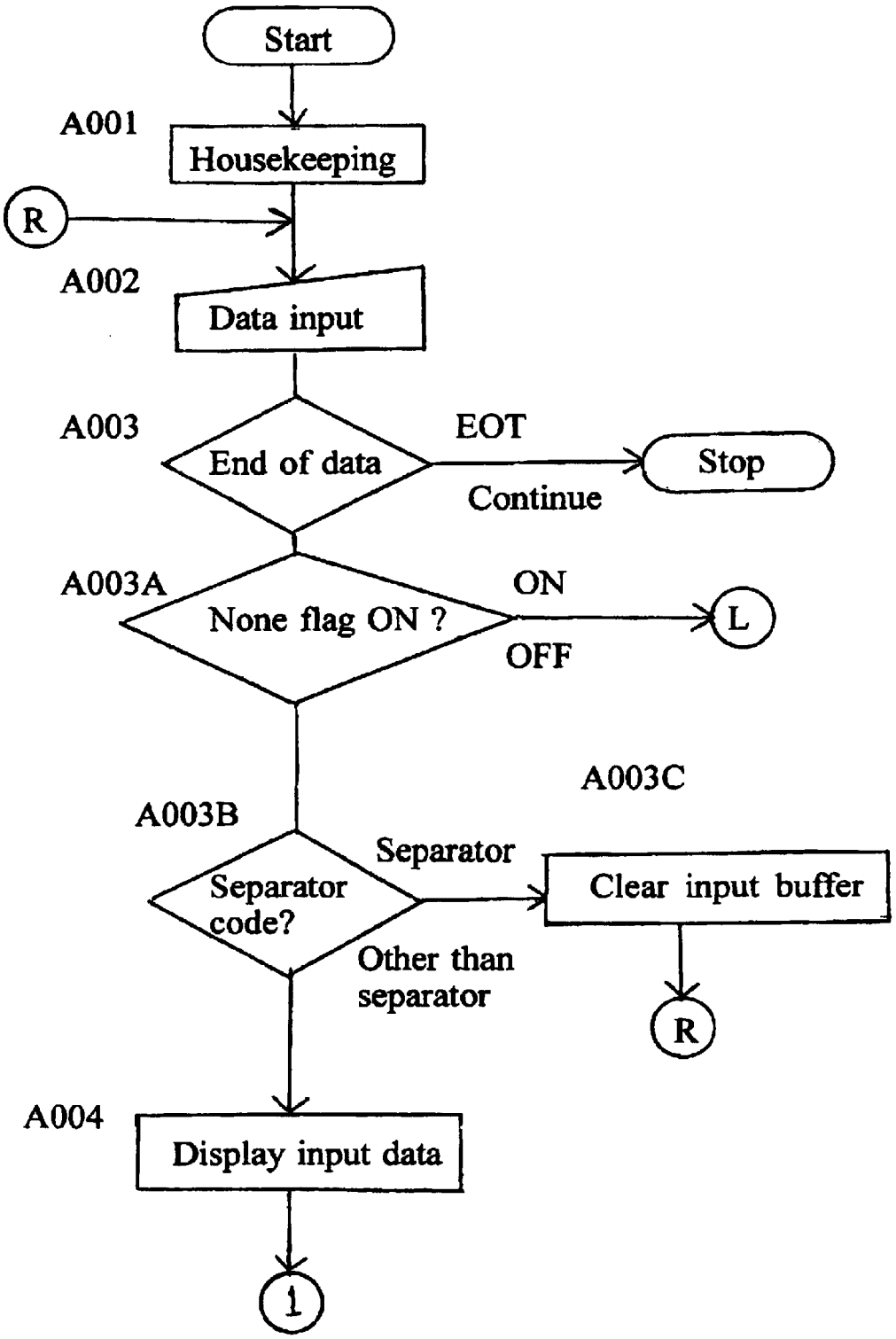

Figure 3   Flowchart
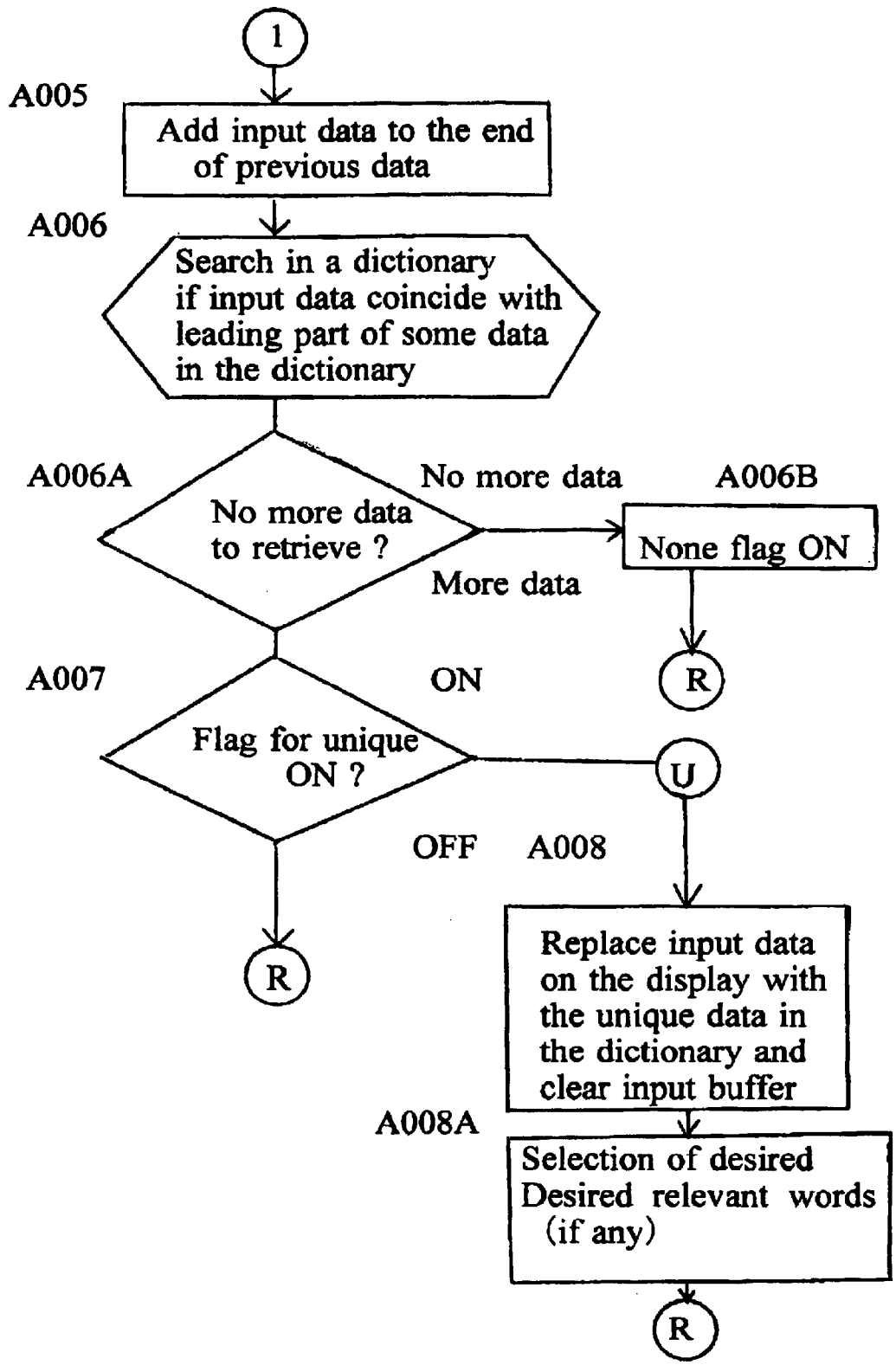

Figure 4 Flowchart
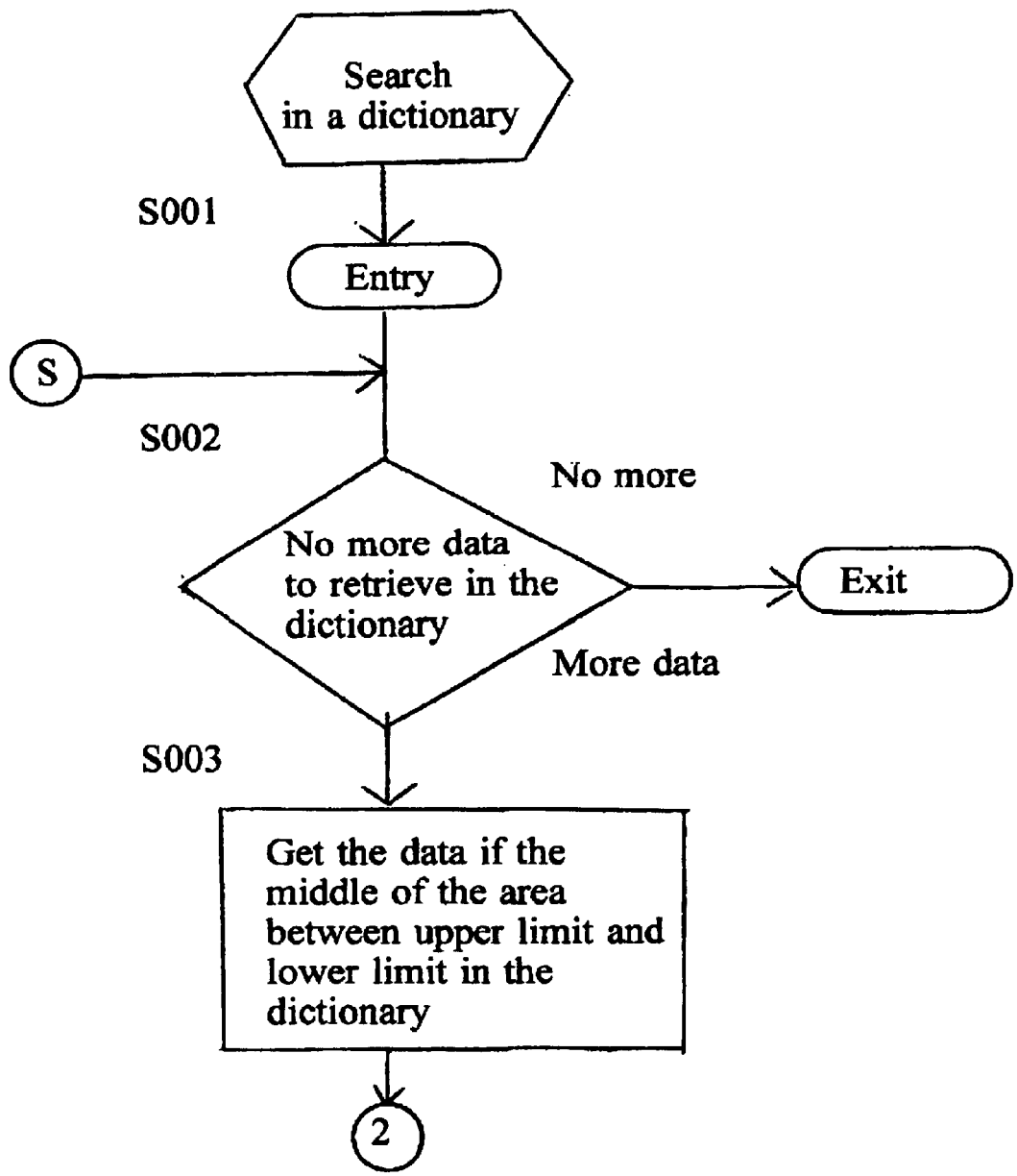

Figure 5 Flowchart
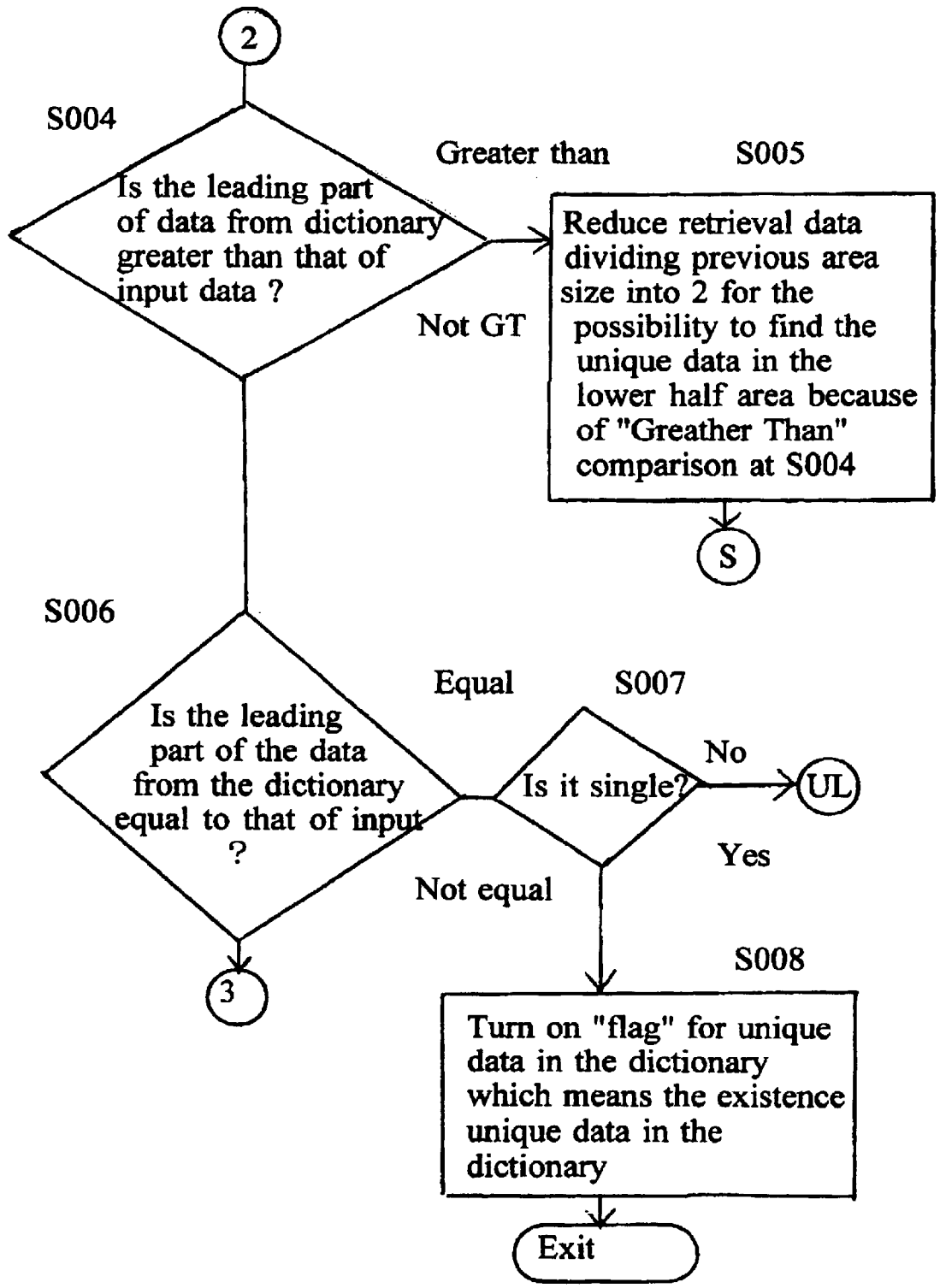

Figure 6 Flowchart
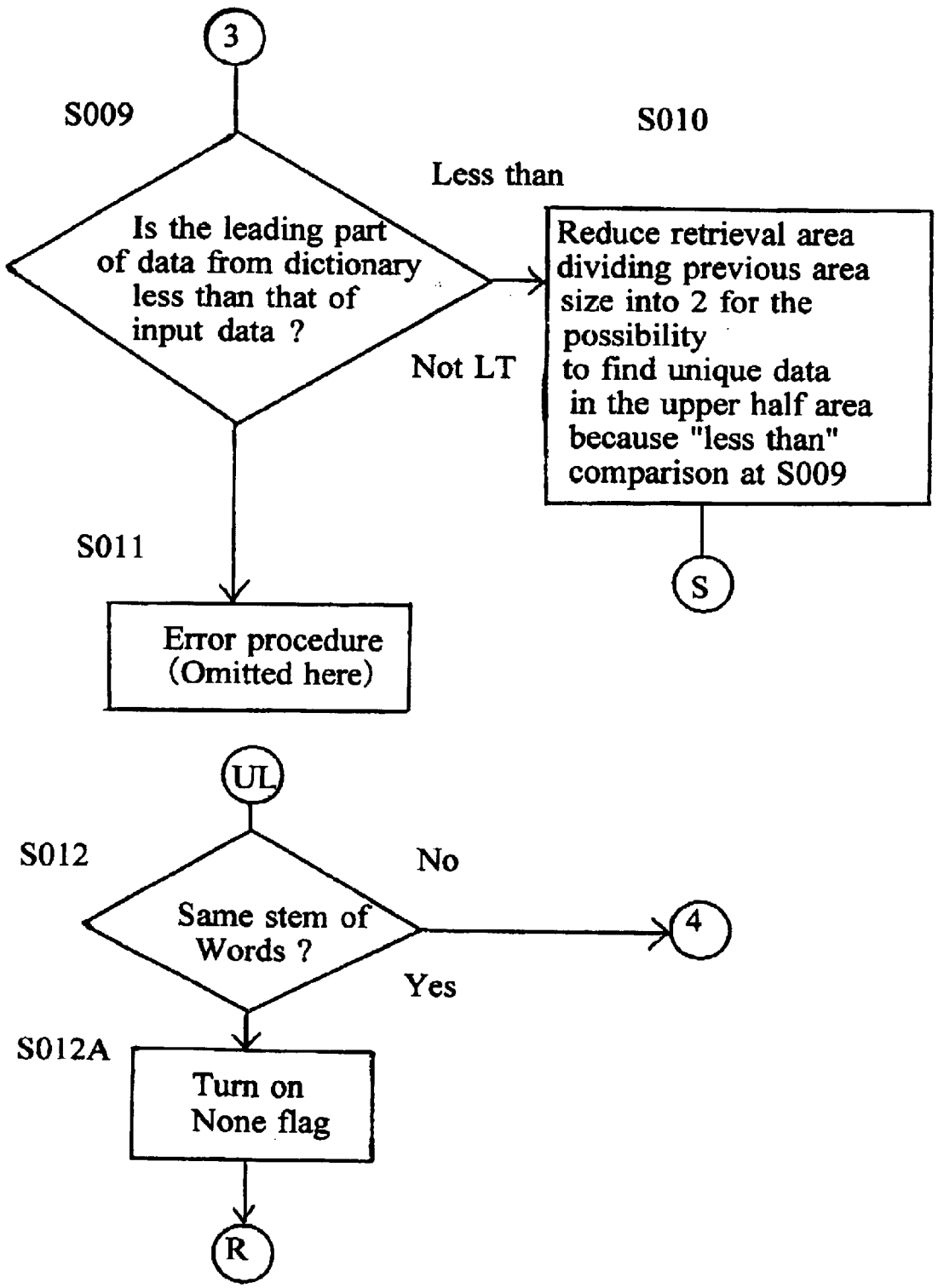

Figure 7 Flowchart
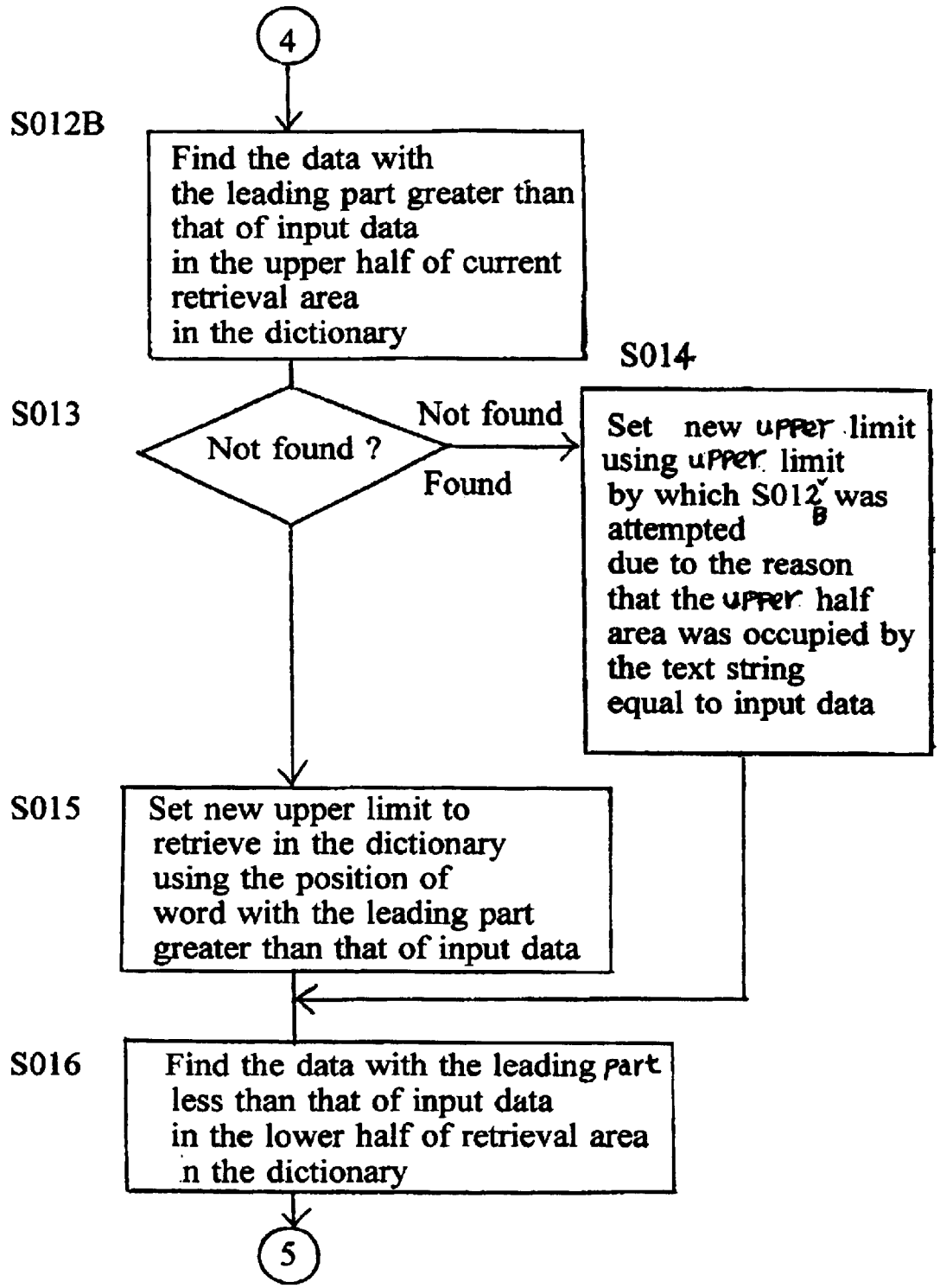

Figure 8  Flowchart
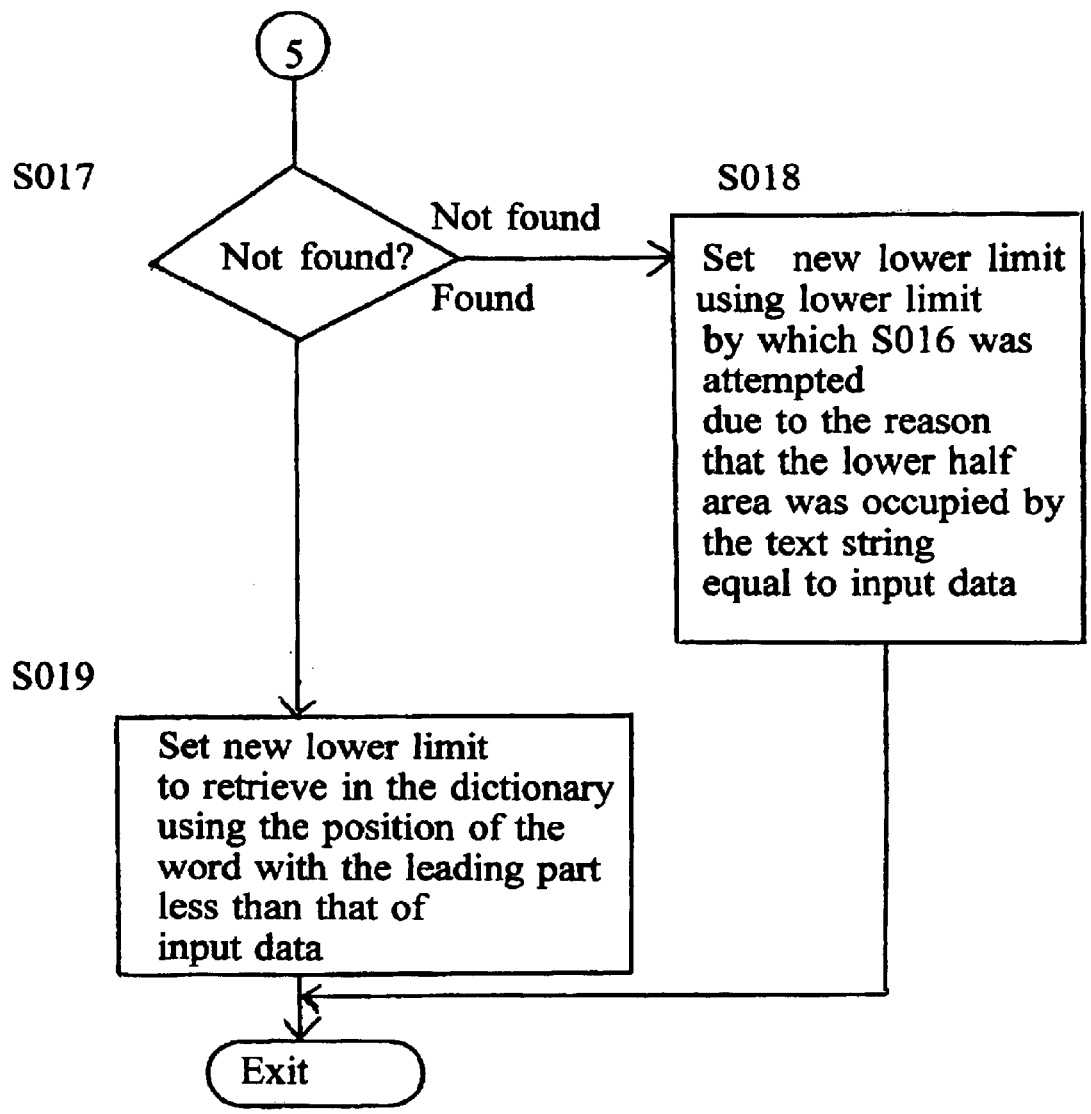

Figure 9 Flowchart
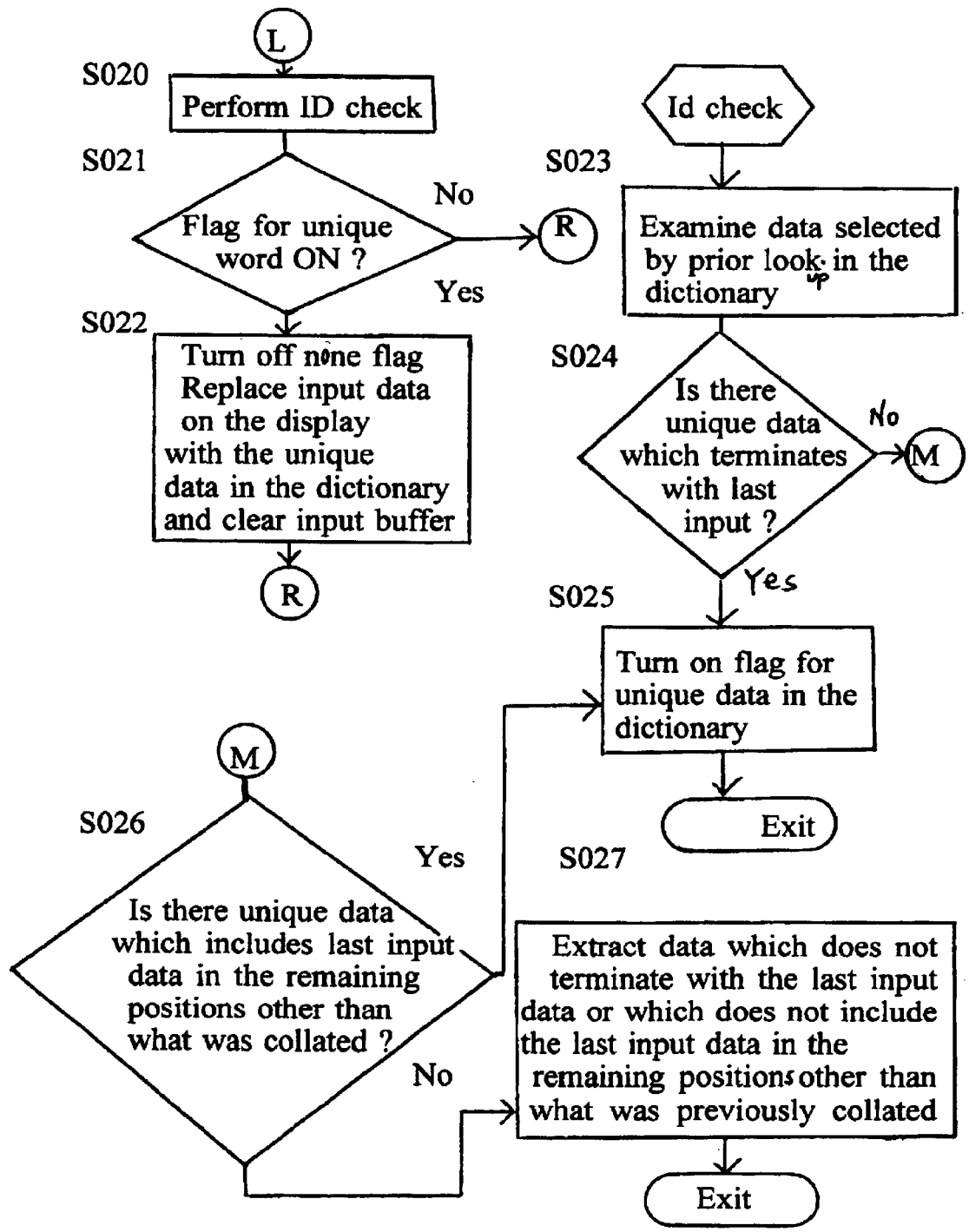

Figure 10 Flowchart
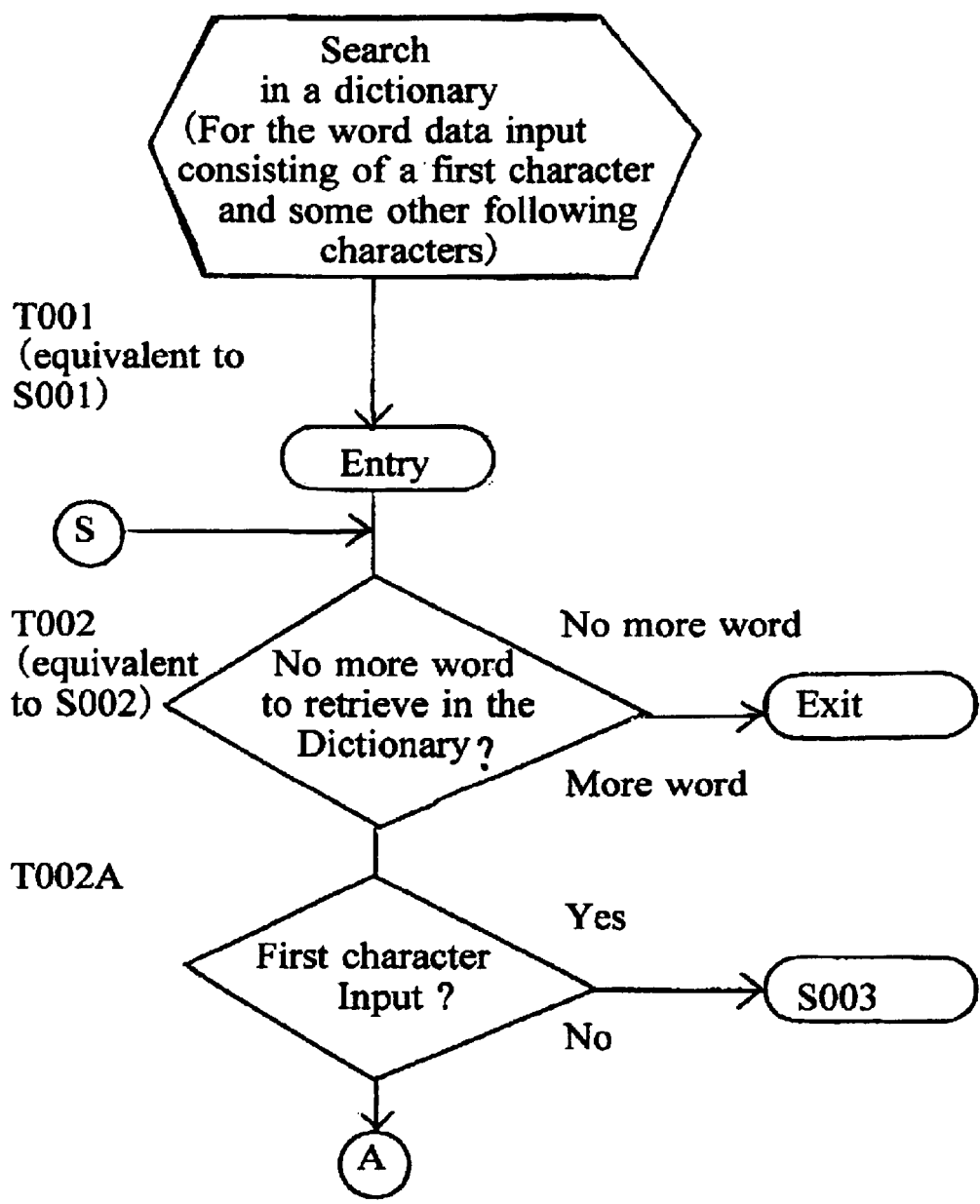

Figure 11 Flowchart
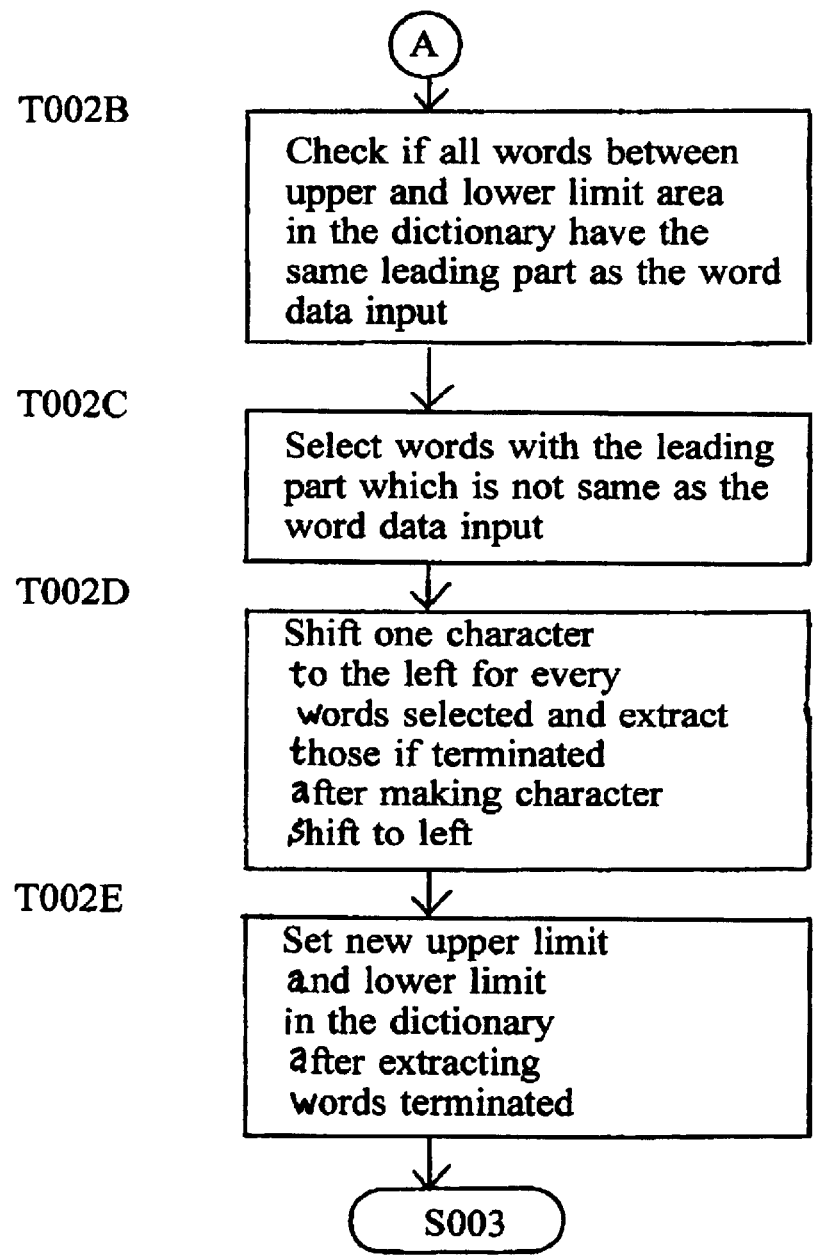

Figure 12

Word pattern element data dictionary - Examples

| # | Handwriting character pattern element codes | Original word characters |
|---|---|---|
| 1 | 00 01 01 10 02 00 30 11 11 11 | 修 |
| 2 | 00 20 12 02 01 20 10 02 25 12 02 01 45 55 | 録 |
| 3 | 02 01 12 11 02 | 正 |
| 4 | 02 11 25 12 12 00 30 | 更 |
| 5 | 04 01 10 20 12 02 01 10 20 | 除 |
| 6 | 11 20 10 01 24 12 12 11 05 | 削 |
| 7 | 14 20 30 10 10 12 11 25 12 20 10 02 | 登 |

In row 1, "00" is underbraced, with element shapes shown below: ╱ │ │ ╱ ─ ╱ ＼ ╱ ╱ ╱

In row 7, "14" is underbraced, with element shapes shown below: ７ 丶 ＼ ╱ ╱ ─ │ ┐ ─ ＼ ╱ ─

│

╱ ╱ ＼ ＼

│ │ ՚

── ─

ϡ ╱ ┐ ɜ ϲ ϶

⌡ ⌡ ┐ ∟ ＞ ＜

∫

Figure 13   Dictionary

| Line of text | Original words | Relevant words |
|---|---|---|
| easi | easily | |
| east | east | eastern, eastword |
| easy | easy | |
| eat | eat | |
| eb | ebb | |
| ecc | eccentric | |
| eco | economic | economical, economics, economy |
| ede | eden | |
| edib | edible | |
| edif | edifice | |
| edit | edit | edition, editor, editorial |
| edu | educate | education, educational |
| effe | effect | effective |
| egg | egg | |
| egy | egypt | egyptian |
| eig | eight | eighteen, eight, eighty, either |
| elab | elaborate | |
| elap | elapse | |
| elas | elastic | |
| elb | elbow | |
| eld | elder | |
| el | el dorado | |
| elect | electric | electrical, electricity, electron, electronic, electronica |
| electi | election | |
| eleg | elegance | elegant, elegy |
| elem | element | elemental, elementary |
| elep | elephant | |
| elev | elevate | elevator, eleven, eleventh |

Figure 14  Dictionary II

Original word    The number of character positions to be unique

|
|
easily          4
east            4
eastern         5
eastward        5
easy            4
eat             3
ebb             2
eccentric       3
                 ("entric" is supplied from dictionary )
echo            3
economic        8
|
|
economical      ⎫
economy         ⎪
eden            ⎪
edible          ⎪
edifice         ⎬  (omitted here)
edit            ⎪
edition         ⎪
editor          ⎪
editorial       ⎪
educate         ⎭
education
educational
effect
effective
efficiency
efficient
effort
  |
  |

HANDWRITING TEXT INPUT SYSTEM

This is a continuation of Ser. No. 08/330,573 filed on Oct. 28,1994, abandoned.

BACKGROUND OF THE INVENTION

1. Field of the Invention

The present invention relates to a text input system to lower the burden of text input for an information processing and communication control system.

As one of the text input method, a conventional system utilizes an abbreviation or shorthand words. For example, it has a dictionary with plural number of words which are compared with the data input, and the word data corresponding to the data input is fetched from the dictionary and no more input is necessary.

In case of the above-mentioned method, it is necessary to remember the abbreviation and activate the system function to find a desired word by depressing a corresponding key, and its efficiency depends on an operator's capability, as the operator has to remember all the characters of the abbreviation or shorthand words in the dictionary which correspond to those of data input for the successful functioning to find a match.

2. Description of the Prior Art

The conventional method has a common way to accept a leading part of word data or a radical of Chinese character or Japanese kanji character from a keyboard or a handwriting input apparatus. After the operator depresses an enter key or a space key, the data input is compared with the contents of dictionary to find the word which equates the data input and display, if any. The operator may find the desired word on the display and select one of them by the depression of a specific function key.

However, the method to press the enter key or space key as a separator after typing some characters to find the desired word is not suitable for typing on the keyboard in a blind (eyes-free) manner. And it is also unlikely that the operator reiterates the steps to input a line of text, character by character, for the system to collate with the contents of dictionary and display words which have the same leading part as the data input, until some of them is selected by the operator. Its method heavily relies on the operator's ability and does not necessarily contribute to the increase of the input efficiency.

In case of the handwriting input, there would be plenty of words in the dictionary with the same radical as those of Chinese characters or Japanese kanji characters which will cause a frequent change of a list of words for the selection on the display after some data input and the repeated steps to select the desired words among them. Such action may actually decrease the efficiency of data input, e.g. the system first displays the list of radicals and the operator selects the radical to which the system gets back to the operator with the relevant characters for the selection on the display by the operator.

SUMMARY OF THE INVENTION

The text input system of the invention, was intended to provide a way of data input from the keyboard or handwriting stroke input apparatus, giving an efficient and natural way of input for the operator without being conscious of it while it is in use and by the step equivalent to what they have been doing up until now.

The text input system should not give an extra burden and an additional training to the operator, and should be able to increase an efficiency of the data input, using a natural way of input, as well.

In comparison with the conventional method, the invention system collates a data input with the dictionary, character by character, at the time of each data input and replaces the data input on the display with the unique data from the dictionary after finding the unique one which includes data input, in a variety of form of data, and requires no more input. This is the way to really increase the efficiency of data input and lower the burden of operator on the typing.

Additionally, this invention is a flexible and effective way to further increase the efficiency of input, by decreasing the number of words in the dictionary containing the words only with the number of characters more than the specific number, in the dictionary, by way of storing relevant words with the data to collate with the data input, in the dictionary. It would decrease the number of data input and shorten the time required to reach the character position which makes the word unique in the dictionary for the purpose of supplementing the remaining part of word from the dictionary.

In the abbreviation input, the conventional method uses a dictionary consisting of an abbreviation and its original form of word, though the present invention is able to use a standard dictionary, as well as the abbreviation dictionary.

The system does not require special abbreviation dictionary. It is able to utilize the standard dictionary and accept the abbreviation input which contains the first character and some other characters of the word data to input and compares those with the dictionary. Even in case of having the special abbreviation dictionary, the present invention does not require all the characters of the abbreviation to input. In this case, the operator does not have to remember the abbreviation and may input part of it, eg the first character followed by some other characters of the abbreviation and which is unique in the dictionary.

Some examples for the number of character positions in a word to be unique in the dictionary in comparison with the total number of characters of the word, are given in Table 2. The examples of a line of text of characters or strokes are shown in table 1.

Also, there is a possibility to be more quick in finding the unique word in the dictionary, by decreasing the number of short words. For example, "abolish" can be identified at the 4th character position (i.e. abol), in the selective dictionary of following table 2, though it needs 6 characters to be unique in the standard dictionary.

TABLE 1

| Word pattern element codes for handwriting strokes | Original word | The number of position to be unique in the dictionary |
| --- | --- | --- |
| \|<br>02 01 12 11 02<br>— \|  —  \|  — | 正 | 2 |
| 02 11 25 12 12 00 30<br>— \|  ㄱ — — / \<br>\| | 求 | 2 |
| 00 30 12<br>/ \ — | A | 1 |

TABLE 1-continued

| Word pattern element codes for handwriting strokes | Original word | The number of position to be unique in the dictionary |
|---|---|---|
| 01  34<br>\|   3 | B | 1 |
| 12  01  11  11<br>—   \|   —   — | E | 1 |

*In this example,  or "㐅" can be unique at the second pattern element code position.

TABLE 2

| | Standard dictionary | | | Selective dictionary |
| Word (or line of text) | The number of character position in a word to be unique in the dictionary | The total number of char. of the word | | The number of character position in a word to be unique in the dictionary |
|---|---|---|---|---|
| abandon | 4 | 7 | abandon | 3 |
| abate | 4 | 5 | | |
| abbot | 4 | 5 | | |
| abdomen | 3 | 7 | abdomen | 3 |
| abhor | 3 | 5 | | |
| abide | 4 | 5 | | |
| ability | 4 | 7 | ability | 3 |
| abject | 3 | 6 | | |
| able | 4 | 4 | | |
| abnormal | 3 | 8 | abnormal | 3 |
| aboard | 4 | 6 | | |
| abolish | 6 | 7 | abolish | 4 |
| abolition | 6 | 9 | | |
| abominable | 4 | 10 | | |
| abound | 5 | 6 | | |
| about | 5 | 5 | about | 4 |
| above | 4 | 5 | | |
| abridge | 4 | 7 | abridge | 3 |
| abroad | 4 | 6 | | |
| abrupt | 4 | 6 | | |
| absence | 6 | 7 | absence | 4 |
| absent | 6 | 6 | | |
| absinthe | 4 | 8 | | |
| absolute | 6 | 8 | absolute | 5 |
| absorb | 5 | 6 | | |
| absorbent | 7 | 9 | absorbent | 5 |
| abstain | 5 | 7 | abstain | 4 |
| (Total) | 127 | 184 | 41 | 79 |
| | (127/184 = 0.69:31% differences | | (41/79 = 0.52:48% differences (79 is the number of total char.) | |

BRIEF DESCRIPTION OF THE DRAWINGS

FIG. 1 is a block diagram of a text input system according to an embodiment of the invention;

FIGS. 2–11 are flowcharts showing the operation of the invention; and

FIGS. 12–14 show some examples of the dictionary for use in the invention.

DESCRIPTION OF THE PREFERRED EMBODIMENT

In the flowchart of FIG. 2 to FIG. 11, A001 is the first step to clear the contents of the counters, flags, and work area, at the beginning of the data input process.

Next A002 accepts a data input, character by character, or stroke by stroke, from a keyboard or a handwriting input instrument.

A003 checks if the input data is an END code, to show the end of transaction, and If yes, the step goes to the termination of proces. Otherwise, the step proceeds to A003A.

A003A tests if the NONE flag is on which means that there is no data including the data input in the dictionary. If YES, the step goes to S020 in which the ID check steps are performed to find the unique one with the last data same as the last input data in the remaining positions other than that was already collated (in FIG. 9), as the ID check steps are performed after the input of last data and prior to its dictionary search, utilizing a flag of NONE flag which is set on at A006B in FIG. 3. It means that the attempt to search at A006A in FIG. 3 using the previous input has failed and the NONE flag was set ON for the purpose to activate ID check steps to find the data for "leading data and some other data to be unique in the dictionary." If None flag is off, the step proceeds to next A003B.

A003B tests if the input data is a separator code. If it is not separator code, the process proceeds to A004 in which input data is displayed at the end of data input on the display. If it is the separator code at the testing of A003B, the step goes to A003C in which the input buffer is cleared and the step goes back to A002 for the next data input, after displaying the input data at A004, the next A005 adds the data input to the end of previous data string in the input buffer memory. Then, the step goes to A006 that is the subprogram of dictionary search.

A006 performs a dictionary search to get the data which has the same leading part as the data input and which is unique in the dictionary, as one example in the case, because there are some other cases to find the data which is unique, despite the different form of data, e.g. the data input of the first data followed by some other data for the line of text data to represent the unique one in the dictionary and so on.

Next A006A tests if the result of dictionary search at A006 shows that there are data to retrieve in this example. If there is no data, the step goes to A006B in which the NONE flag is turned ON and goes back to A002 for the next data input. In this example, the NONE flag is used for the purpose to do a sequence of "input of following data and ID check" to find the unique data with the same last data as the last data input or with the same last data input in the remaining parts other than that was already collated. If the test result at A006A is not negative, which means that there are still data to retrieve,. step A007 tests if the step of A006 found the unique one in the dictionary by the "flag for the unique ON." If OFF, the step goes back to A002 for the next data input to continue the input and dictionary search.

At A008 branching from A007, the system replaces input data on the display with the unique data from dictionary, the contents of input buffer is cleared for the next data input, and goes to next A008A.

At A008A is the selection step for the case having plural number of relevant words in the dictionary after finding the unique data in the dictionary, in a manner that one of relevant data is selected on the display in this case, because the other selection steps are performed by ID check at S020 in FIG. 9, testing the existence of data which is unique and terminates with the same one as the last data input or which is unique and includes the same one as the last data input in the remaining part that was already collated. Then the step goes back to A002 for the next data input. S001 is an entry of the subprogram to search in the dictionary. S002 is to test if there is no more word to retrieve in the dictionary. If so, the process goes to the exit of this subprogram. If there are words to retrieve at the testing of S002, the process goes to the S003.

S003 gets the data located in the middle of area between an upper limit and a lower limit in the dictionary. In this case, the upper limit means the boundary with the text string which is getting larger, and the lower limit means the boundary which is getting smaller.

S004 compares the data input with the data from the dictionary, and tests if the leading part of word from the dictionary is greater or not.

If the greater flag is ON at S004, S005 divides the retrieval area size into 2 to use the lower half area for the next retrieval, as there is a possibility to find the unique word in the lower half area, because the dictionary data found at S003 was greater than the data input. Then, the step goes back to S002. If the greater than flag is OFF at S004, the step proceeds to S006.

At S006, it is tested if the leading part of word from the dictionary is equal to that of the data input. If equal, S007 is performed to test if it is single. In case of a single one, the next step S008 turns on the flag for the unique data in the dictionary and goes to exit. If there are plural number of data at S007, the step goes to S012. If NOT EQUAL at S006, the step proceeds to S009.

At S009, testing is made as to whether the leading part of word from the dictionary is less than that of the data input.

If the less than flag is ON after testing at S009, S010 divides the retrieval area size into 2 to use the upper half area for the next retrieval, as there is a possibility to find the unique word in the upper half area because the dictionary data found at S003 was less than that of data input. Then, the step goes to S002.

If the less than flag is OFF at S009, there is something wrong with the procedure in the process and goes to the error procedure of S011 which is not described here, due to the matter which is not directly related to the invention. Branching here from S007, S012 tries to find if the plural number of data have the same stem of word. If it is YES, the step goes to S012A in which the NONE flag is turned ON and the step goes back to A002 for the next data input. Othersie, the step goes to S012B.

S012B gets the data with the leading part greater than that of input data in the upper half of current retrieval area in the dictionary.

At the test of next S013 after performing the step of S012B, it is tested if the data was found, and goes to S015 if found. If the data was not found, the step goes to S014.

S015 sets a new upper limit to retrieve using the positions of the data with the leading part of data greater than that of data input, in the dictionary, and goes to next S016.

S014 sets a new upper limit to retrieve in the dictionary using the position of the upper limit by which S012B was attempted, because the upper half area in this case was occupied by the words with the leading part equal to that of data input as a result of the attempt at S012B. Then, the step goes to S016. S016 tries to find the word with the leading part less than that of data input in the lower half area of the dictionary.

Next S017 tests if the data was found.

S018 takes place if not found at S017 and sets a new lower limit using the position of the lower limit by which S016 was attempted, because the lower area was occupied by the words with the leading part equal to that of the data input as a result of the attempt at S016. Then, the step goes to the exit of this subprogram.

S019 arises if the data was found at S017 and sets new lower limit to retrieve using the positions of the data with the leading part less than that of the data input and jumps to the exit of this sub-program.

Branching from A003A when NONE flag is ON, S020 performs the steps named ID check in this case to start with S023 which is an entry of subprogram.

S023 and followings check if there is the unique data which has the last data same as the last data input, or which includes the same one as the last data input in the remaining part other than that was already collated with the data input.

Next S021 checks the flag for the unique data, after coming back from ID check. If its flag is OFF, the step goes back to A002 for the next data input. If the flag is ON, the step proceeds to next S022 which turns the NONE flag OFF and supplements the remaining part of data input on the display, ie the replacement of the data input with the unique data found. Then, the step goes back to A002 for the next data input.

S023 is the start of a subprogram which performs determination process of the unique data. S023 examines data which were selected by the prior look-up in the dictionary.

S024 tests if there is the unique data which terminates with the same one as the last data input. If YES, the step goes to next S025 which turns the FLAG for the unique data ON and goes to exit of this subprogram. If NO at the test of S024, the step goes to S026.

At S026, it is tested if there is the unique data which includes the last data input in the remaining positions other than that was already collated with data input. If YES, the step goes to S025. If NO, the step proceeds to the next S027 in which the system extracts data which do not have the same one as the last data input or which do not include the same one as the last data input in the remaining part other than that was already collated with the data input, for the next retrieval.

As a subset of the dictionary search for the data input consisting of a first character and some other characters, T001 which equivalent to the afore-mentioned S001, is an entry of this subprogram.

T002 which is equivalent to the afore-mentioned S002 checks if there is still more word to retrieve in the dictionary. If there is no more word, the step goes to the exit. The process advances to the next T002A, if there are words to retrieve.

T002A branches to the aforementioned S003 if the input is the first one of the data input, and goes to the next T002B if it was not the first one.

T002B is to check if all words between upper and lower limit in the dictionary have the same leading part as that of the data input.

T002C selects the words with the leading part which is not the same as that of the data input.

T002D shifts one character to the left for every words selected at T002C and extract those words which terminated after making a character shift.

T002E sets new upper and lower limit to retrieve in the dictionary after extracting words terminated at T002D. Then, the step goes to the aforementioned S003.

FIG. 12 is an example for the word pattern element data for handwriting characters. In this example, assuming that "正" is going to be input, at the time of input of its first stroke "−", #3 and #4 words exist in this dictionary. Next stroke of "|" selectes #3 only which corresponds to the input of "−|" in this case, and "正" is replaced with the data input on the display.

FIG. 13 and 14 are examples of the dictionary containing a line of text, original word, and relevant words.

What is claimed is:

1. A text input system comprising:

means for entering a line of text, character by character;

means for storing a plurality of lines of text, in a dictionary;

means for identifying plural lines of text with the same first part which includes said entered line of text in said dictionary, and determining a unique line of text which has the same last character as the last entered character, among said identified plural lines of text, at the tine of character input;

means for identifying plural lines of text with the same first part which includes said entered line of text in said dictionary, and determining a unique line of text which includes the same one as the last entered characters in the remaining part of line of text in said dictionary other than that was successfully collated with said entered line of text, among said identified plural lines of text, at the time of character input;

means for replacing said entered line of text with what was determined by said means for identifying and determining.

2. A text input system as in claim 1, wherein said system comprises:

means for storing a plurality of lines of text, original words and a unique position count for said line of text in a dictionary;

means for determining a unique line of text in said dictionary which includes said entered line of text, and which has said unique position count same as the number of last collated character position of said line of text in said dictionary collated with said entered line of text, at the time of character input, at the tine of character input;

means for replacing said entered line of text with said unique line of text or said original word which was determined by said means for determining.

3. A text input system as in claim 1, wherein said system comprises:

means for identifying plural lines of text with the same stem of word in said dictionary which includes said entered line of text, and determining a unique line of text which has the same last character as the last entered character, among said identified plural lines of text, at the time of character input;

means for identifying plural lines of text with the same stem of word in said dictionary which includes said entered line of text and determining a unique line of text which includes the same one as the last entered characters in the remaining part of line of text in said dictionary other than that was successfully collated with said entered line of text, among said identified plural lines of text, at the time of character input;

means for replacing said entered line of text with what was determined by said means for identifying and determining.

4. A text input system as in claim 1, wherein said system comprises:

means for storing a plurality of lines of text and relevant words for said line of text in a dictionary;

means for determining a unique line of text stored with plural number of said relevant words in said dictionary which includes said entered line of text, and selecting a unique word among said relevant words which includes said entered line of text in the remaining part of line of text in said dictionary other than that was already collated with said entered line of text, at the time of character input, means for replacing said entered line of text with said unique line of text or said unique word which was determined and selected by said means for determining and selecting.

5. A text input system as in claim 1, wherein said system comprises:

means for entering a line of text consisting of a first character followed by some other following characters, character by character;

means for determining a unique line of text in said dictionary which includes said entered line of text, at the time of character input;

means for replacing said entered line of text with said unique line of text which was determined by said means for determining.

6. A text input system as in claim 1, wherein said means for determining said unique line of text comprises determining a predetermined number of lines of text, in said dictionary.

7. A text input system comprising:

means for entering a line of text of handwriting strokes, stroke by stroke;

means for storing a plurality of lines of text of handwriting strokes, original word and a unique position count for said line of text of handwriting strokes, in a dictionary;

means for determining a unique line of text of handwriting strokes in said dictionary which includes said entered line of text of handwriting strokes and which has said unique position count same as the number of last collated stroke position of said line of text of handwriting strokes in said dictionary collated with said entered fine of text of handwriting strokes, at the time of entering the handwriting stroke;

means for replacing said entered line of text of handwriting strokes with said unique line of text of handwriting strokes or said original word which was determined by said means for determining.

8. A text input system as in claim 7, wherein said system comprises:

means for identifying plural lines of text of handwriting strokes with the same first part which includes said entered line of text of handwriting strokes in said dictionary, and determining a unique line of text of handwriting strokes which has the same one as the last entered stroke, among said identified plural lines of text of handwriting strokes, at the time of entering the handwriting stroke;

means for identifying plural lines of text of handwriting strokes with the same first part which includes said entered tine of text of handwriting strokes in said dictionary, and determining said unique line of text of handwriting strokes which includes the same one as the last entered strokes in the remaining part of line of text of handwriting strokes in said dictionary other than that was successfully collated with said entered line of text of handwriting strokes in said dictionary, among said identified plural lines of text of handwriting strokes, at the time of entering the handwriting stroke.

9. A text input system as in claim 7, wherein said system comprises:

means for entering a line of text of handwriting strokes consisting of a first stroke and some other following strokes, stroke by stroke;

means for determining a unique line of text of handwriting strokes in said dictionary which contains said entered first stroke and some other following strokes, at the time of entering the handwriting stroke;

means for replacing said entered line of text of handwriting strokes with said unique line of text of handwriting strokes which was determined by said means for determining.

10. A text input method comprising the steps of:

entering a line of text, character by character;

storing a plurality of lines of text, and relevant words for said line of text, in a dictionary;

identifying plural lines of text with the same first part which includes said entered line of text in said dictionary, and determining a unique line of text which has the same last character as the last entered character, among said identified plural lines of text, at the time of character input;

identifying plural lines of text with the same first part which includes said entered line of text in said dictionary, and determining a unique line of text which includes the same one as the last entered characters in the remaining part of line of text in said dictionary other than that was successfully collated with said entered line of text, among said identified plural lines of text, at the time of character input;

means for replacing said entered line of text with what was determined by said means for identifying and determining.

11. A text input system as in claim 10, wherein said method comprises the steps of:

storing a plurality of lines of text, original words and a unique position count for said line of text, in a dictionary;

determining a unique line of text in said dictionary which includes said entered line of text and which has said unique position count same as the number of last collated character position of said line of text in said dictionary collated with said entered line of text, at the time of character input;

replacing said entered line of text with said unique line of text or said original word which was determined by said determining step.

12. A text input method as in claim 10, wherein said method comprises the steps of:

identifying plural lines of text with the same stem of word which includes said entered line of text in said dictionary, and determining a unique line of text which has the same last character as the last entered character, among said identified plural lines of text, at the time of entering characters;

identifying plural lines of text with the same stem of word which includes said entered line of text in said dictionary, and determining a unique line of text which has the same one as the last entered characters in the remaining part of line of text in said dictionary other than that was successfully collated with said entered line of text, among said identified plural lines of text, at the time of entering characters;

replacing said entered line of text with what was determined by said identifying and determining steps.

13. A text input method as in claim 10, wherein said method comprises the steps of:

determining a unique line of text stored with plural number of said relevant words in said dictionary, and selecting a unique word among said relevant words which includes said entered line of text in the remaining part of line of text in said dictionary other than that was already collated with said entered line of text, at the time of character input;

replacing said entered line of text with said unique line of text or said unique word which was determined and selected by said determining and selecting steps.

14. A text input method as in claim 10, wherein said method comprises the steps of:

entering a line of text consisting of a first character followed by some other following characters, character by character;

determining a unique line of text in said dictionary which contains said entered first character and some other following characters of line of text, at the time of character input;

replacing said entered line of text with said unique line of text which was determined by said determining step.

15. A text input method as in claim 10, wherein said determining step comprises determining a predetermined number of lines of text in said dictionary.

16. A text input method comprising the steps of:

entering a line of text of handwriting strokes, stroke by stroke;

storing a plurality of lines of text of handwriting strokes, original words and a unique position count for said line of text of handwriting strokes, in a dictionary;

determining a unique line of text of handwriting strokes in said dictionary which includes said entered line of text of handwriting strokes and which has said unique position count same as the number of last collated stroke position of said line of text of handwriting strokes in said dictionary collated with said entered line of text of handwriting strokes, at the time of entering the handwriting stroke;

replacing said entered line of text of handwriting strokes with said unique line of text of handwriting strokes or said original word determined by said determining step.

17. A text input method as in claim 16, wherein said method comprises the steps of:

identifying plural lines of text of handwriting strokes with the same first part which includes said entered line of text of handwriting strokes, and determining a unique line of text of handwriting strokes which has the same last stroke as the last entered stroke, among said identified plural lines of text of handwriting strokes, at the time of entering the handwriting stroke;

identifying plural lines of text of handwriting strokes with the same first part which includes said entered line of text of handwriting strokes, and determining a unique line of text of handwriting strokes which includes the same one as the last entered strokes in the remaining part other than that was successfully collated with said entered line of text of handwriting strokes, among said identified plural lines of text of handwriting strokes, at the time of entering the handwriting stroke.

18. A text input method as in claim 16, wherein said method comprises the steps of:

entering a line of text of handwriting strokes consisting of a first stroke and some other following strokes of handwriting strokes, stroke by stroke;

determining a unique line of text of handwriting strokes in said dictionary which contains said entered first stroke and some other following strokes, at the time of entering the handwriting stroke;

replacing said entered line of text of handwriting strokes with said unique line of text of handwriting strokes which was determined by said determining step.

\* \* \* \* \*